(12) United States Patent
Shah et al.

(10) Patent No.: US 8,937,858 B2
(45) Date of Patent: Jan. 20, 2015

(54) REDUCING ACCESS NETWORK CONGESTION CAUSED BY OVERSUBSCRIPTION OF MULTICAST GROUPS

(75) Inventors: Kunal Shah, Mountain View, CA (US); Avoy Nanda, Milpitas, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 344 days.

(21) Appl. No.: 12/891,565

(22) Filed: Sep. 27, 2010

(65) Prior Publication Data

US 2012/0075998 A1     Mar. 29, 2012

(51) Int. Cl.
*H04L 12/26* (2006.01)
*H04L 12/18* (2006.01)
*H04L 12/801* (2013.01)

(52) U.S. Cl.
CPC .......... *H04L 12/185* (2013.01); *H04L 12/1886* (2013.01); *H04L 47/15* (2013.01); *H04L 47/12* (2013.01)
USPC ........................................................ 370/230

(58) Field of Classification Search
USPC ............ 370/273; 379/1.03; 375/22, 346, 249, 375/350
See application file for complete search history.

(56) References Cited

U.S. PATENT DOCUMENTS 5,231,633 A * 7/1993 Hluchyj et al. ................ 370/429
8,139,501 B2 * 3/2012 Andou et al. .................. 370/254
8,584,170 B2 * 11/2013 Park et al. ....................... 725/51
8,717,886 B2 * 5/2014 Yamamoto ..................... 370/230
2003/0012137 A1 * 1/2003 Abdelilah et al. ............. 370/229

FOREIGN PATENT DOCUMENTS

WO     2006027380 A1 * 3/2006
WO     WO 2006027380    * 3/2006  .............. H04L 12/18
WO     WO 2006027380 A1 * 3/2006  .............. H04L 12/18

OTHER PUBLICATIONS

Daniel et al, (WO 2006/027380, "A Device and Method for Multicasting Packets in a Subscriber Network") published Mar. 16, 2006.*
Fenner ("Internet Group Management Protocol, Version 2" RFC 2236; published Nov. 1997).*

(Continued)

*Primary Examiner* — Andrew Lai
*Assistant Examiner* — Mario Malcolm
(74) *Attorney, Agent, or Firm* — Blakely Sokoloff Taylor & Zafman LLP

(57) ABSTRACT

A multicast router is coupled with a multicast enabled layer 2 device that is coupled with a source of multicast data traffic for multicast groups. Responsive to determining that the amount of bandwidth currently being attributed as being used by the subscriber exceeds its allowed bandwidth limit due to oversubscription of multicast groups, the multicast router switches from periodically transmitting multicast membership general query messages to the multicast hosts of the subscriber, to transmitting one or more multicast membership group-specific query messages to one or more multicast hosts of the subscriber for a subset of the subscribed multicast groups to impede the subscribed multicast groups that are not part of the subset from being refreshed to cause the multicast data traffic for those multicast groups from being transmitted on the access network to the multicast hosts of the subscriber.

19 Claims, 7 Drawing Sheets

(56) References Cited

OTHER PUBLICATIONS

Daniel ("A Device and Method for Multicasting Packets in a Subscriber Network" WO 2006027380; published Mar. 16, 2006) same as Document N.*
Juniper Networks ("Using Multicast Call Admission Control for IPTV Bandwidth Management"; published Feb. 2008).*
Fenner, "Internet Group Management Protocol, Version 2", Request for Comments 2236, Nov. 1997).*
Daniel, "A Device and Method for Multicasting Packets in a Subscriber Network", WO 2006027380, Mar. 16, 2006) same as Document N.*
Juniper Networks, "Using Multicast Call Admission Control for IPTV Bandwidth Management"; Feb. 2008.*
Vida et al., "Multicast Listener Discovery Version 2 (MLDv2) for IPv6", Request for Comments 3810, Jun. 2004, 62 pages.*
Juniper Networks, "IGMP Snooping on EX Series Switches Overview", <https://www.juniper.net/techpubs/en_US/junos10.3/topics/concept/igmp-snooping-ex-series-overview.html>, Jun. 29, 2010.*
Using Multicast Call Admission Control for IPTV Bandwidth Management, Managing Multicast Bandwidth in IPTV Networks Using Multicast Call Admission Control in the Edge Router, Part No. 350121-001, Juniper Networks, Inc., Feb. 2008, 14 pages.
B. Cain et al., Internet Group Management Protocol, Version 3, Network Working Group, Request for Comments: 3376, Oct. 2002, 54 pages.
R. Vida et al., Multicast Listener Discovery Version 2 (MLDv2) for IPv6, Network Working Group, Request for Comments: 3810, Jun. 2004, 63 pages.
M. Christensen et al., Considerations for Internet Group Management Protocol (IGMP)and Multicast Listener Discovery (MLD) Snooping Switches, Network Working Group, Request for Comments: 4541, May 2006, 16 pages.

* cited by examiner

REDUCING ACCESS NETWORK CONGESTION CAUSED BY OVERSUBSCRIPTION OF MULTICAST GROUPS

FIELD

Embodiments of the invention relate to the field of networking; and more specifically, to reducing congestion at an access network caused by oversubscription of multicast groups.

BACKGROUND

Multicast traffic (e.g., IPTV (Internet Protocol Television)) is distributed to multicast hosts using IP multicast technology. A multicast host joins a particular multicast group (e.g., a particular IPTV channel) by transmitting a multicast membership report message (e.g., using IGMP (Internet Group Management Protocol) described in RFC 3376, "Internet Group Management Protocol, Version 3", October 2002; or MLD (Multicast Listener Discovery) described in RFC 3810, "Multicast Listener Discovery Version 2 (MLDv2) for IPv6", June 2004) (it should be understood that previous versions of IGMP and MLD may also be used) that indicates the multicast group to be joined which is propagated through the network to the multicast source. A multicast host can leave a multicast group by transmitting a multicast membership report message (e.g., using IGMP or MLD) that indicates the multicast group to be left, which may be propagated through the network to the multicast source.

A multicast router manages the membership of multicast hosts and their groups and performs the functions of a multicast router as defined in RFC 3376 or 3810. For example, the multicast router maintains a forwarding table which indicates which multicast hosts are interested in receiving data traffic for which multicast groups, based on the multicast membership report messages received from the multicast hosts. When a multicast router receives a multicast membership report message that indicates that a multicast host has left a multicast group, the multicast router can respond by transmitting a multicast membership group-specific query message to that multicast host confirming the multicast host has left the multicast group. A multicast membership group-specific query message is sent to learn the reception state of a multicast host with respect to a single multicast group (that multicast group is indicated in the multicast membership group-specific query message). In addition to the multicast router managing the membership of multicast hosts, different equipment in the network maintains multicast membership of the multicast hosts (e.g., a forwarding table which indicates which multicast hosts are interested in receiving data traffic for which multicast groups).

The multicast hosts need to periodically refresh their multicast membership state by periodically transmitting multicast membership report messages for the multicast group that indicate that they are still interested in receiving the data traffic for that multicast group. If a multicast host does not refresh their multicast membership state for a particular multicast group, the state will expire and that multicast host will stop receiving the multicast data traffic for that multicast group. In an IPTV network, the multicast hosts rely on the multicast router periodically transmitting a multicast membership general query message in order to renew their membership state. A multicast membership general query message is sent by the multicast router to learn the complete multicast reception state of a multicast host.

A subscriber is an entity (e.g., a person, a company, a household) that has one or more multicast hosts. The multicast router may also terminate the sessions for the subscribers and perform other services including AAA (Authentication, Authorization, and Accounting) processing. AAA processing can be provided through a client/server model, where the AAA client is implemented on the multicast router and the AAA server can be implemented either locally on the multicast router or on a remote end station (e.g., server end station) coupled with the multicast router and information provided through a AAA protocol (e.g., RADIUS (Remote Authentication Dial-In User Service), Diameter, and/or TACAS+(Terminal Access Controller Access Control System)). Authentication is the process of identifying and verifying a subscriber. For instance, a subscriber might be identified by a combination of a username and a password or through a unique key. Authorization determines what a subscriber can do after being authenticated, such as gaining access to certain end station information resources (e.g., through the use of access control policies). Accounting is recording user activity. AAA processing is performed to identify the subscriber record for a subscriber. A subscriber record includes a set of attributes (e.g., subscriber name, password, authentication information, access control information, rate-limiting information, policing information, etc.) used during processing of that subscriber's traffic. In particular, each of the subscribers has a bandwidth limit, which may be the size of the physical connection between the customer premise equipment of a subscriber and the access network or may be a function of a service level.

In some network topologies, the multicast router is located between the multicast source and the multicast hosts (the multicast source is located behind the multicast router). In such a topology, the multicast router receives the multicast membership report messages from the multicast hosts and can determine whether to process and forward those report messages to the multicast source to enable the multicast data traffic to be transmitted to the multicast hosts. The multicast router may determine not to process and forward a multicast membership report message to the multicast source if it determines that doing so would exceed the bandwidth limit of the subscriber whose multicast host transmitted the multicast membership report message. Thus in this topology, the multicast router can directly control the multicast group membership of the multicast hosts.

In other network topologies, the multicast source is located between the multicast router and the multicast hosts. In such a topology, the multicast data traffic does not flow through the multicast router. In addition, the multicast membership report messages are propagated to the multicast source without first being forwarded through the multicast router (the multicast router may also receive the multicast membership report messages). As a result, the multicast hosts can join a multicast group without the multicast router determining whether to accept or deny a multicast host from joining a multicast group. For example, the multicast router may be coupled with a multicast enabled layer 2 device that performs multicast snooping and is located between the multicast router and the multicast source. The multicast snooping may be performed as described in RFC 4541, "Considerations for Internet Group Management Protocol (IGMP) and Multicast Listener Discovery (MLD) Snooping Switches", May 2006. The layer 2 network element is coupled with an access network (e.g., one or more access network elements such as one or more DSLAMs (Digital Subscriber Line Access Multiplexer), CMTSs (Cable Modem Termination System), and/or OLTs (Optical Line Terminals)) through which the multicast hosts are coupled. The layer 2 network element receives the multicast membership report messages and floods them towards the multicast source and to the multicast router. Upon receiving a multicast membership report message for a multicast group from a multicast host, the multicast source begins streaming the multicast data traffic for that multicast group to that multicast host. In such a topology, since the multicast source is not behind the multicast router, the multicast router cannot ignore or drop the multicast membership report messages to prevent subscribers from exceeding their bandwidth limit due to their multicast host(s) oversubscribing to multicast groups. Oversubscribing to multicast groups can cause congestion and packet loss in the access network.

SUMMARY

A multicast router for reducing congestion in an access network caused by subscribers oversubscribing to multicast groups is described. In one embodiment, the multicast router is coupled with a multicast enabled layer 2 device that is itself coupled with a source of multicast data traffic for multiple multicast groups. The multicast enabled layer 2 device also maintains multicast membership state of the multicast groups. The multicast router receives a first multicast membership report message that indicates that a multicast host of a subscriber has joined a first multicast group at a time when a multicast host of the subscriber is also currently subscribed to a set of one or more second multicast groups. The multicast router calculates an amount of bandwidth that is currently being attributed as being used by the subscriber based on at least an amount of bandwidth that is required for the first multicast group and the set of second multicast groups. Responsive to determining that the amount of bandwidth currently being attributed as being used by the subscriber exceeds its allowed bandwidth limit due to joining the first multicast group, the multicast router switches from periodically transmitting multicast membership general query messages to the multicast hosts to periodically transmitting one or more multicast membership group-specific query messages to those of the multicast hosts that are a member of the set of second multicast groups. The multicast membership group-specific query messages do not request membership reception state of the first multicast group with the intention of impeding the multicast host from refreshing its membership to the first multicast group to cause the multicast membership state of the multicast host for the first multicast group in the multicast enabled layer 2 device to expire and the multicast data traffic for the first multicast group from being transmitted to the multicast host. Congestion in the access network is reduced since the multicast hosts of the subscriber are impeded from maintaining its multicast group oversubscription.

In another embodiment, a multicast router to reduce congestion in an access network caused by oversubscription of multicast groups is described. The multicast router includes a control card having a multicast module configured to receive multicast membership report messages originated from a set of one or more multicast hosts of a plurality of subscribers. Each multicast membership report message indicates multicast group membership status of one of the multicast hosts of one of the subscribers for one or more multicast groups. The multicast data traffic for the one or more multicast groups is not forwarded through the multicast router. The multicast module is also configured to track bandwidth usage of the plurality of subscribers based at least in part on the received multicast membership report messages, and for each subscriber whose bandwidth usage exceeds their allowed bandwidth limit due to oversubscription to a plurality of multicast groups, the multicast module causes a transition from periodically transmitting multicast membership general query messages to the set of multicast hosts of the subscriber, to periodically transmitting one or more multicast membership group-specific query messages to one or more of the multicast hosts of the subscriber for a subset of one or more of the subscribed multicast groups to impede those multicast hosts from refreshing their membership to other multicast groups not included in the subset of the subscribed multicast groups. Congestion in the access network is reduced by impeding the multicast hosts of the subscribers from maintaining their multicast group oversubscription.

In another embodiment, a system to reduce congestion in an access network includes a multicast source of multicast data traffic for a plurality of multicast groups, a multicast enabled layer 2 device that is coupled with the multicast source, a multicast router, and an access network element. The multicast enabled layer 2 device is configured to maintain multicast membership state to the plurality of multicast groups for multicast hosts of subscribers that are coupled with the access network element, and further configured to forward multicast membership report messages originated from the multicast hosts to the multicast source and the multicast router. The multicast router includes a multicast module. The multicast module receives and processes the multicast membership report messages. Each multicast membership report message indicates a multicast group membership status of one of the multicast hosts of one of the subscribers for one or more of the multicast groups. The multicast module is also configured to track bandwidth usage of the subscribers based at least in part on the received multicast membership report messages and for each subscriber whose bandwidth usage exceeds their allowed bandwidth limit due to oversubscription of multicast groups, cause a transition from periodically transmitting multicast membership general query messages to the multicast hosts of the subscriber, to periodically transmitting one or more multicast membership group-specific query messages to one or more of the multicast hosts of the subscriber for a subset of one or more of the subscribed multicast groups to impede those multicast hosts from refreshing their membership to other multicast groups not included in the subset of the subscribed multicast groups to reduce the bandwidth usage attributed to the subscriber. Congestion in the access network element is reduced by impeding multicast hosts of the subscribers from maintaining their multicast group oversubscription.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
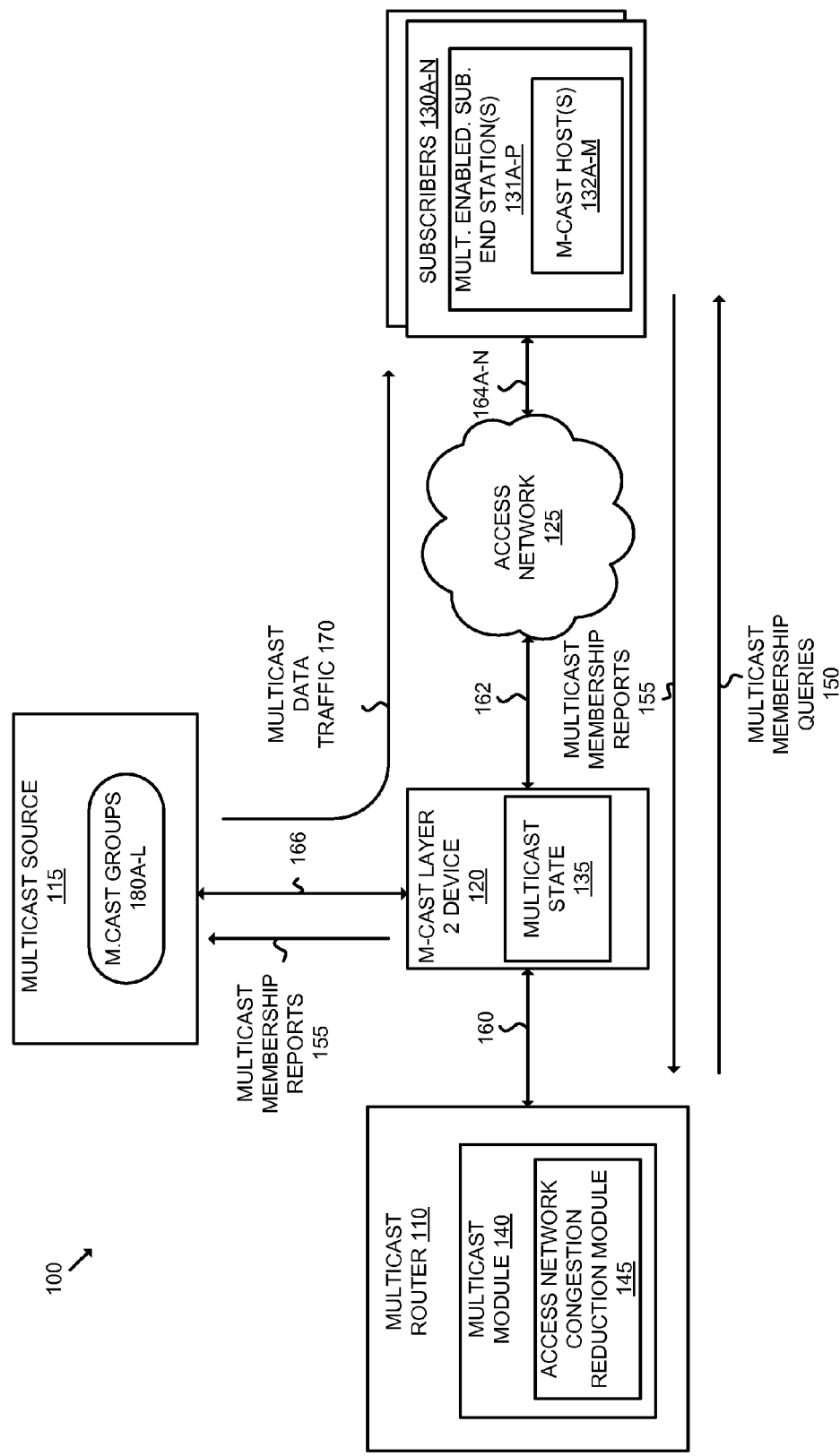
FIG. 1 illustrates an exemplary multicast network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for reducing congestion at an access network caused by oversubscription of multicast groups is described. In one embodiment, a multicast router reduces congestion at an access network by impeding the multicast host(s) of subscribers from oversubscribing to multicast groups. The multicast router receives multicast membership report messages from the multicast host(s) of the subscribers and determines the bandwidth usage attributed to the subscribers. If a subscriber's bandwidth usage is below its allowed bandwidth limit, the multicast router transmits multicast membership general query messages to the multicast host(s) of the subscriber, which allows those multicast host(s) to refresh each of the multicast groups it a member of. However, if the subscriber's bandwidth usage is above its allowed bandwidth limit, instead of transmitting general query messages, the multicast router transmits one or more multicast membership group-specific query messages to identified one(s) of the multicast host(s) of the subscriber for a subset of one or more of that subscriber's subscribed multicast groups with the intention of impeding some of the multicast host(s) of the subscriber from refreshing its membership to multicast groups that are not included in the multicast membership group-specific query messages to reduce the subscriber's bandwidth usage to be at or below its allowed bandwidth limit. Since the multicast hosts rely on responding to the multicast membership query messages to refresh the state of the subscribed multicast groups and only a subset of the subscribed multicast groups are sent in the multicast membership group-specific query message(s), the multicast host(s) will be impeded from refreshing membership state for other multicast groups and their state will expire thereby causing the multicast traffic for those multicast groups to stop being transmitted to those multicast host(s) of the subscriber.

FIG. 1 illustrates an exemplary multicast network 100 according to one embodiment. The multicast network 100 includes the multicast router 110, the multicast source 115, the multicast enabled layer 2 device 120, the access network 125, and the subscribers 130A-N. The multicast source 115 is the source of the multicast data traffic 170 for the multicast groups 180A-L. The multicast source 115 is typically a multicast server that is responsible for originating the multicast traffic and may be the creator of the multicast traffic or it may be a Rendezvous Point (RP) that serves as a distribution point for the multicast traffic. The multicast source 115 is coupled with the multicast enabled layer 2 device (e.g., a switch) 120 over the connection 166. It should be understood that the multicast source 115 is not directly coupled with the multicast router 110. Thus, as illustrated in the exemplary multicast network 100, the multicast source is not located behind the multicast router 110.

The subscribers 130A-N each have one or more multicast enabled subscriber end station(s) 131A-P (e.g., one or more set-top boxes, laptops, desktops, smartphones, or other computing devices capable of receiving multicast traffic) that each implement one or more multicast hosts 132A-M. The multicast hosts 132A-M can join different ones of the multicast groups 180A-L by transmitting multicast membership report messages 155. The multicast enabled subscriber end station(s) 131A-P of the subscribers 130A-N are coupled with the access network 125 through the access network connections 164A-N respectively. Thus, the multicast hosts 132A-M of the subscribers 130A-N receive the multicast data traffic 170 over the access network connections 164A-N respectively. Although not illustrated in FIG. 1, it should be understood that one or more of the subscribers 130A-N may include subscriber end stations that receive unicast data traffic (e.g., VoIP (Voice over Internet Protocol) enabled devices, laptops, desktops, workstations, or other computing devices capable of receiving unicast data traffic) through the access network 125 on the same access network connections 164A-N that carry the multicast data traffic. In addition, although not illustrated in FIG. 1, the subscribers 130A-N typically each also have customer premise equipment (e.g., router(s), switch(es), modem(s), etc.) that physically connect one or more of the subscriber end station(s) of the subscribers 130A-N with the access network 125 through the access network connections 164A-N.

The multicast router 110 terminates subscriber sessions for the subscribers 130A-N. In one embodiment, the multicast router 110 internally represents a single subscriber session per subscriber including all of the subscriber end stations of the subscriber. For example, the multicast router 110 may maintain a single subscriber circuit that represents the data traffic (including the multicast data traffic) attributed to all of the subscriber end stations of a particular subscriber. A subscriber circuit uniquely identifies within the multicast router 110 a subscriber session and typically exists for the lifetime of the session. In another embodiment, the multicast router 110 maintains a subscriber session per multicast host of a subscriber and a subscriber session for other data traffic for that subscriber. For example, the multicast router 110 maintains a separate subscriber circuit for each multicast host of a subscriber and one or more other subscriber circuits representing other non-multicast data traffic attributed to that subscriber.

Each of the subscribers 130A-N is associated with an allowed bandwidth limit, which can be different for different subscribers. The allowed bandwidth limit may be different in different embodiments. For example, in one embodiment, the allowed bandwidth limit for a particular subscriber 130 may be the amount of bandwidth supported by its corresponding access network connection 164. In another embodiment, the allowed bandwidth limit for a particular subscriber 130 may be a function of a service or subscription level for that subscriber 130 (e.g., a premium service may have a higher allowed bandwidth limit than a non-premium service), not to exceed the amount of bandwidth supported by its corresponding access network connection 164. In other embodiments, one or more of the subscribers 130A-N are associated with an allowed bandwidth limit specific to multicast data traffic (a multicast allowed bandwidth limit) and may also be associated with other allowed bandwidth limits.

The access network 125 includes one or more access network elements such as one or more DSLAMs (Digital Subscriber Line Access Multiplexer), CMTSs (Cable Modem Termination System), and/or OLTs (Optical Line Terminals). The access network connections 164A-N for the subscribers 130A-N each have an upper limit on the amount of bandwidth it can support, which may be the same as the allowed bandwidth limit of the subscriber.

The access network 125 is coupled with the multicast enabled layer 2 device 120 over the connection 162. The multicast enabled layer 2 device 120 is also coupled with the multicast router 110 over the connection 160 and with the multicast source over the connection 166. The multicast enabled layer 2 device 120 operates at layer 2 but also includes multicast functionality such as performing multicast snooping (e.g., IGMP or MLD snooping). The multicast enabled layer 2 device 120 performs multicast snooping to process the layer 3 multicast packets such as multicast membership report messages 155 transmitted by the multicast host(s) 132A-M of the subscribers 130A-N and to maintain the multicast state 135 (their membership to the multicast groups) of the subscribers. For example, upon receiving a multicast membership report message 155 from a multicast host 132 of a subscriber 130 for a particular multicast group 180 (the multicast membership report message 155 is received through the access network 125 on the connection 162), the multicast enabled layer 2 device 120 adds that multicast host (e.g., by adding the port number to reach the multicast enabled subscriber end station 131 implementing that multicast host) to a forwarding entry for that particular multicast group 180 in the multicast state structure 135. The multicast enabled layer 2 device 120 then floods the multicast membership report message 155 to the multicast source 115 over the connection 166 and to the multicast router 110 over the connection 160. It should be understood that the multicast source 115 may not be directly connected to the multicast enabled layer 2 device 120 as there may be one or more other network devices between them.

The multicast router 110 includes the multicast module 140 to manage the membership of the multicast host(s) 132A-M of the subscribers 130A-N to the multicast groups 180-N. The multicast module 140 is an implementation of a multicast management protocol such as IGMP or MLD with enhancements to reduce access network congestion caused by the subscribers oversubscribing to multicast groups. The multicast module 140 receives the multicast membership report messages 155 from the multicast host(s) 132A-M of the subscribers 130A-N (which are flooded by the multicast enabled layer 2 device 120 to the multicast router 110 over the connection 160). The multicast router 110 transmits multicast membership queries 150 to the multicast host(s) 132A-M of the subscribers 130A-N to learn the multicast reception state of the subscribers 130A-N. The multicast module 140 also tracks the bandwidth usage attributed to the subscribers 130A-N. The multicast module 140 includes the access network congestion reduction module 145 that, as will be described in greater detail herein, causes the multicast router 110 to selectively transmit multicast membership group-specific query messages to multicast host(s) of those subscribers that have oversubscribed their session (i.e., have exceeded their allowed bandwidth limit) that include a subset of the subscribed multicast groups to impede the multicast host(s) of the subscribers from refreshing their membership to all of their multicast groups. The multicast router 110 also terminates the sessions for the subscribers 130A-N and may perform other services including AAA (Authentication, Authorization, and Accounting) processing, Quality of Service, and/or subscriber management, and/or provide support for multiple application services (e.g., data, voice, and video).

The multicast data traffic 170 for the multicast groups 180A-L is carried through the multicast enabled layer 2 device 120 through the access network 125 to the subscribers 130A-N. Thus, the multicast data traffic 170 for the multicast groups 180A-L is not forwarded through the multicast router 110. The multicast data traffic for each of the multicast groups 180A-L requires a certain amount of bandwidth to transmit to the subscribers 130A-N (which may be different for different multicast groups). Specifically, each multicast group 180A-L requires a certain amount of bandwidth between the access network 125 and the subscribers 130A-N. In case where the multicast data traffic 170 is IPTV data traffic, typically the traffic for a multicast group is continuously streamed to those subscribers that are a member of that multicast group.

The multicast source 115 receives the multicast membership report messages 155 from the subscribers 130A-N without them first being processed by the multicast router 110. As a result, there is the possibility that the subscribers 130A-N can oversubscribe their subscriber session by joining more multicast groups than their allowed bandwidth limit supports. This may cause congestion at the access network 125 and/or the multicast layer 2 device 120. For example, if a subscriber 130 has an allowed bandwidth limit of 10 Mbps and joins multiple multicast groups that use a combined amount of bandwidth of 15 Mbps, that subscriber will be oversubscribed and may cause congestion at the access network 125. Congestion at the access network 125 may cause packet loss for the oversubscribed subscriber as well as other subscribers connected on the same access network 125. For example, if multiple subscribers are connected to the same access network element (e.g., DSLAM) and one or more of them oversubscribes their session, there is the possibility that more packets can be received at the access network element from the multicast enabled layer 2 device 120 than can be processed by that access network element. As a result of that congestion, some packets may be lost (both multicast packets and other packets that may also be received at the access network element) which may belong to any of the subscribers connected to that access network element.

Figure 2A:
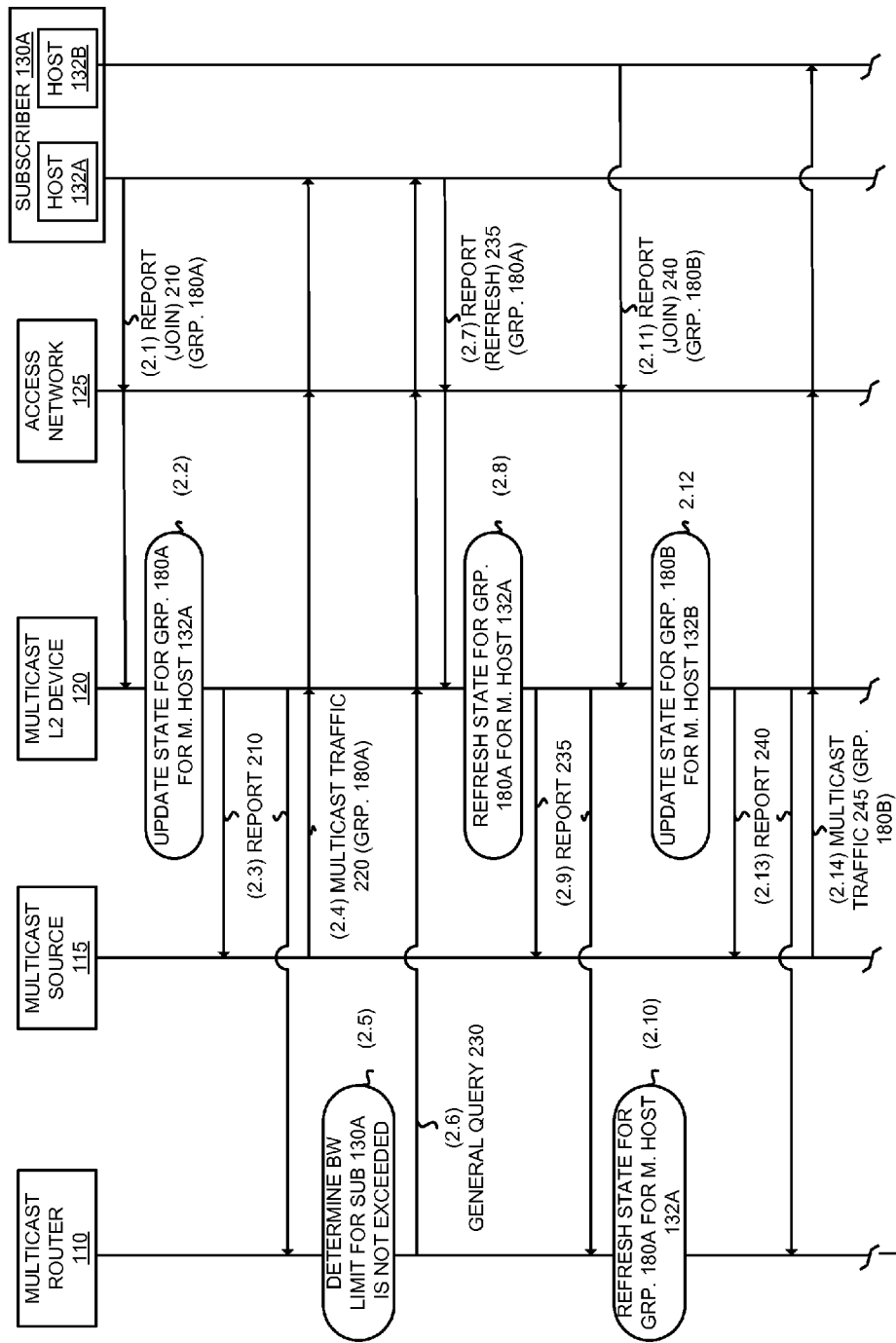
FIG. 2A illustrates part of an exemplary data flow of operations performed responsive to a subscriber oversubscribing their session due to excess multicast group membership according to one embodiment.
Figure 2B:
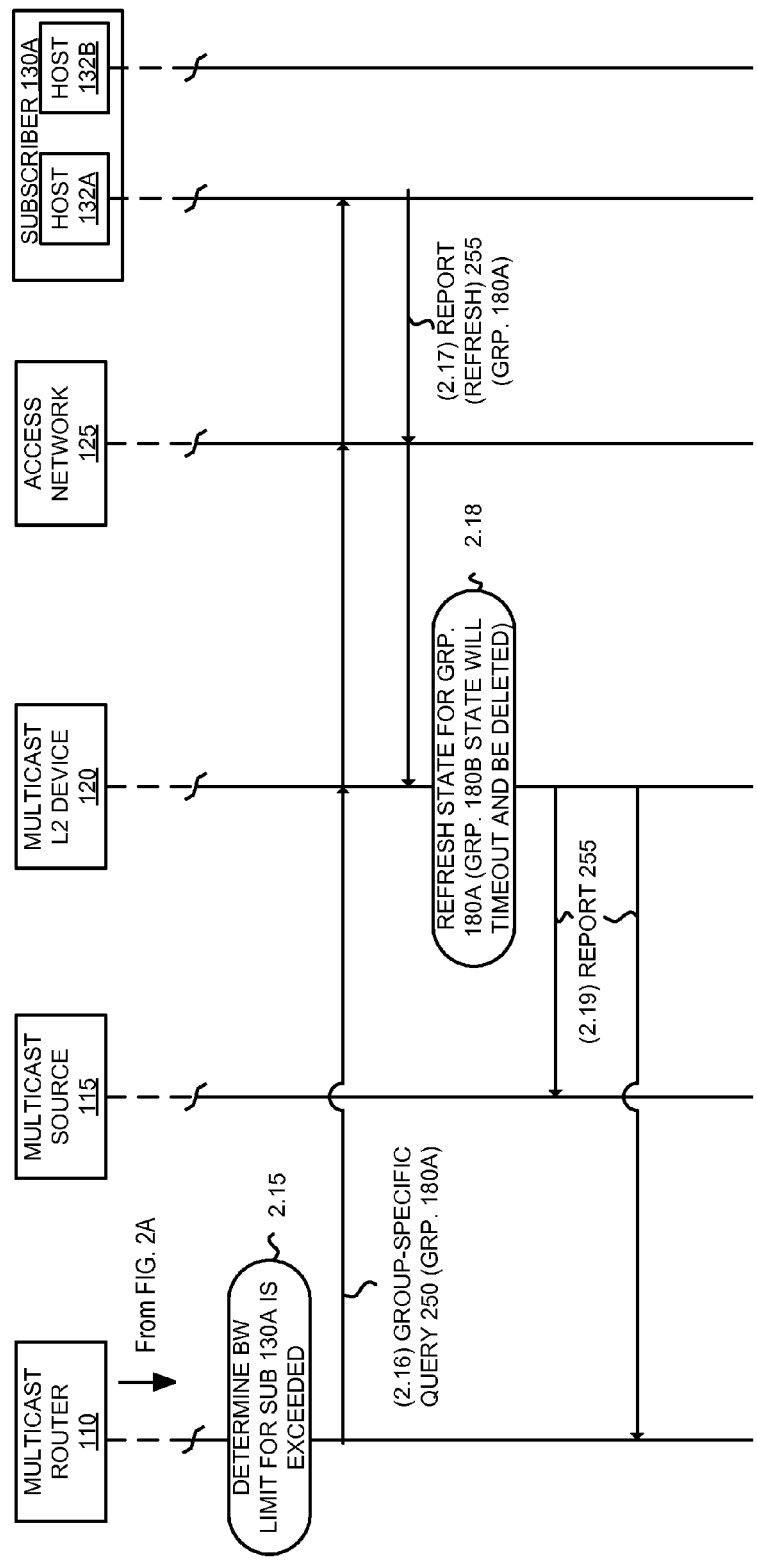
FIG. 2B illustrates the remainder of the exemplary data flow of operations performed responsive to a subscriber oversubscribing their session due to excess multicast group membership according to one embodiment.

FIGS. 2A-B illustrate an exemplary data flow of operations performed responsive to a subscriber oversubscribing their session due to excess multicast group membership according to one embodiment. FIG. 2 will be described with reference to a single subscriber (namely subscriber 130A), however it should be understood that similar operations can be performed for each of the subscribers 130B-N. In addition, for purposes of simplicity, the subscriber 130A is illustrated as including the multicast hosts 132A-B, however it should be understood that the subscriber 130A may include more or less multicast hosts. Moreover, the operations of FIG. 2 will be described with reference to the exemplary embodiment of FIG. 3. However, it should be understood that the operations of FIG. 2 can be performed by embodiments of the invention other than those discussed with reference to FIG. 3, and the embodiments discussed with reference to FIG. 3 can perform operations different than those discussed with reference to FIG. 2.

At operation 2.1, the multicast host 132A of the subscriber 130A transmits a multicast membership report message 210 that indicates that it is joining the multicast group 180A (a multicast join message). This multicast membership report message 210 may have been transmitted in response to a multicast membership query message (a solicited multicast membership report message) or transmitted upon a local decision (an unsolicited multicast membership report message) (e.g., the multicast enabled subscriber end station such as a set-top box was powered on and tuned to a specific IPTV channel). The multicast membership report message 210 is transmitted through the access network 125 and is received at the multicast enabled layer 2 device 120 (the multicast enabled layer 2 device 120 snoops the multicast membership report message 210).

Responsive to receiving the multicast membership report message, at operation 2.2, the multicast enabled layer 2 device 120 updates its multicast state to indicate that the multicast host 132A is interested in receiving multicast data traffic for the multicast group 180A. For example, the multicast enabled layer 2 device 120 adds the port to reach the multicast host 132A to a forwarding entry for the multicast group 180A in the multicast state structure 135. The multicast enabled layer 2 device 120 then floods the multicast membership report message 210 towards the multicast source 115 and the multicast router 110 at operation 2.3.

Sometime after the multicast source 115 receives the multicast membership report message 210, the multicast host 132A begins receiving the multicast data traffic corresponding to the multicast group 180A. Thus at operation 2.4, the multicast source 115 streams the multicast data traffic for the multicast group 180A to the multicast host 132A after receiving the multicast membership report message 210. The multicast data traffic is carried through the multicast enabled layer 2 device 120 and the access network 125. It should be understood that the multicast data traffic for the multicast group 180A will continue to be transmitted to the multicast host 132A as long as it is a member of the multicast group 180A.

Figure 3:
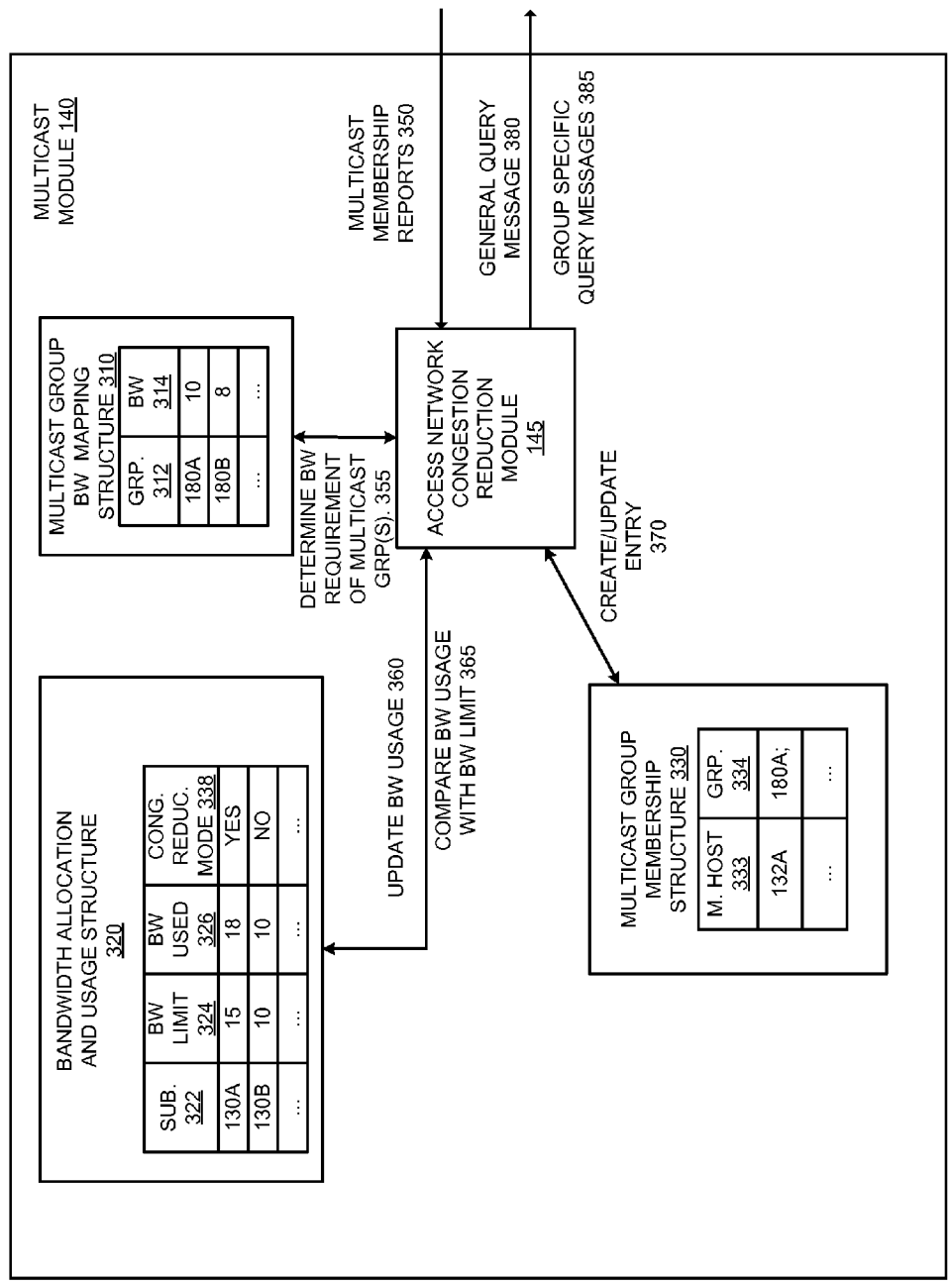
FIG. 3 is a data flow diagram illustrating an exemplary implementation of the multicast module of the multicast router illustrated in FIG. 1 according to one embodiment.

Sometime after the multicast router 110 receives the multicast membership report message 210 flooded from the multicast enabled layer 2 device 120, the multicast router 110 processes the multicast membership report message 210 and determines whether to impede the multicast host 132A of the subscriber 130A from refreshing its membership to the multicast group 180A or joining an additional multicast group, and whether to impede other multicast hosts of the subscriber 130A from joining additional groups based on whether the bandwidth attributed to the subscriber 130A exceeds the allowed bandwidth limit for the subscriber. With reference to FIG. 3, which is a data flow diagram illustrating an exemplary implementation of the multicast module 140 according to one embodiment, the access network congestion reduction module 145 receives the multicast membership report message 210 at operation 350. In one embodiment, the multicast membership report message 210 is received on a subscriber circuit for the subscriber 130A.

Referring back to FIG. 2, at operation 2.5, the multicast router 110 determines that the amount of bandwidth currently attributed as being used by the subscriber 130A does not exceed its bandwidth limit. In certain situations, a subscriber may have multiple multicast hosts that are joined to the same multicast group at the same time. For example, a subscriber may have two set-top boxes that are each tuned to the same channel. Depending on the way the multicast group membership and the multicast router is configured, there may be only a single stream of traffic for that multicast group being delivered to the subscriber's premise (e.g., carried on the access network connection 164) or there may be a separate stream of traffic delivered to the subscriber's premise for each multicast host that is a member of that multicast group. In embodiments where there is a single stream of traffic delivered to the subscriber's premise for a particular multicast group regardless of the number of multicast hosts of that subscriber that are members of that multicast group, determining the amount of bandwidth currently being attributed to the subscriber 130A includes determining whether that subscriber 130A has a different multicast host that is currently a member of the multicast group. If there is such a multicast host that is currently a member of that group, the amount of bandwidth on the access network will not be increased by the multicast host 132A joining the group. In embodiments where there is a separate stream of traffic delivered to the subscriber's premise for each multicast host that is a member of the same multicast group, the amount of bandwidth on the access network is increased by the multicast host 132A joining the group.

Since the multicast data traffic 170 is not forwarded through the multicast router 110, determining the amount of bandwidth currently being attributed to the subscriber 130A includes determining and adding the amount of bandwidth required for the data traffic of the multicast group 180A (if applicable) to the subscriber's current bandwidth usage (which may include bandwidth for unicast data traffic); and comparing that value to the subscriber's allowed bandwidth limit. For example, with reference to FIG. 3 and assuming that there will be a separate stream of traffic per multicast host or that the subscriber 130A does not have another multicast host that is currently a member of the multicast group 180A, the access network congestion reduction module 145 determines the amount of bandwidth required for the multicast group 180A (and thus the amount of traffic carried between the access network 125 and the multicast host 132A for the multicast group 180A) in operation 355. As illustrated in FIG. 3, the multicast group bandwidth mapping structure 310 provides a mapping of the amount of bandwidth required for each of the multicast groups 180A-L. In one embodiment and as depicted in FIG. 3, the multicast group bandwidth mapping structure 310 includes a multicast group field 312 and a bandwidth field 314. In one embodiment, the information in the multicast group bandwidth mapping structure 310 is configured by a network administrator or other operator of the multicast router 110. Thus at operation 355 the access network congestion reduction module 145 accesses the multicast group bandwidth mapping structure 310 to determine the amount of bandwidth necessary for the multicast group 180A.

The access network congestion reduction module 145 then updates the amount of bandwidth being attributed to the subscriber 130A to include the amount of bandwidth necessary for the multicast group 180A at operation 360. In one embodiment, a bandwidth allocation and usage structure 320 stores the amount of bandwidth being attributed to the subscribers. As illustrated in FIG. 3, the bandwidth allocation and usage structure 320 includes a subscriber field 322, a bandwidth limit field 324, a bandwidth usage field 326, and an access network congestion reduction mode field 338 that indicates whether the subscriber is being processed in access network congestion reduction mode, which will be described in greater detail later herein. Thus, the update bandwidth usage field operation 360 updates the bandwidth usage field 326 of the subscriber according to one embodiment.

After the amount of bandwidth being attributed to the subscriber 130A is updated to include the amount of bandwidth consumed by the multicast data traffic of the multicast group 180A for the multicast host 132A, the access network congestion reduction module compares the updated amount of used bandwidth against the allowed bandwidth limit of the subscriber 130A at operation 365. For example, the bandwidth allocation and usage structure 320 is accessed for the subscriber 130A and the value in the bandwidth used field 326 for the subscriber 130A is compared against the value in the bandwidth limit field 324 for the subscriber 130A in operation 365.

In one embodiment, the access network congestion reduction module 145 also adds the multicast host 132A as a member of the multicast group 180A. In one embodiment, the multicast module 140 maintains a multicast group membership structure 330 for each subscriber to track the group membership of the multicast hosts of that subscriber. In one embodiment and as illustrated in FIG. 3, the multicast group membership structure 330 includes the multicast host field 333 and the multicast group field 334. While FIG. 3 illustrates a multicast group membership structure for each subscriber, it should be understood that this is exemplary and that there can be a single group membership structure for the subscribers. The access network congestion reduction module 145 creates or updates an entry 370 for the multicast host 132A to indicate that it is a member of the multicast group 180A.

Referring back to FIG. 2A, after determining that the bandwidth limit for the subscriber 130A is not exceeded, the multicast router 110 transmits a multicast membership general query message 230 to the multicast host 132A of the subscriber 130A at operation 2.6. The multicast membership general query message 230 is transmitted through the multicast enabled layer 2 device and the access network 125. With reference to FIG. 3, the access network congestion reduction module 145 causes the multicast membership general query message 230 to be transmitted to the multicast host at operation 380. The multicast router 110 will also transmit a multicast membership general query message to other multicast hosts of the subscriber 130A that are currently a member of a multicast group.

The multicast membership general query message 230 is received at the multicast host 132A. Since the message 230 is a multicast membership general query message, the multicast host 132A of the subscriber 130A will respond with its membership state (e.g., it will indicate each multicast group that it is a member of). The multicast host 132A of the subscriber 130A can also respond to the multicast membership general query message with an indication that it wants to join another, different, multicast group. In the example depicted in FIG. 2A, responsive to receiving the multicast membership general query message 230, at operation 2.7 the multicast host 132A transmits a multicast membership report message 235 that indicates that it is a member of the group 180A (a multicast refresh message). At this point in the example, the subscriber 130A has only a single multicast host that is a member of a single multicast group.

The multicast membership report message 235 is received at the multicast enabled layer 2 device 120 and at operation 2.8, the multicast enabled layer 2 device 120 refreshes the multicast membership state for the group 180A for the multicast host 132A (e.g., it resets a timer associated with that multicast group 180A for the multicast host 132A). The multicast enabled layer 2 device then floods the multicast membership report message 235 towards the multicast source 115 and the multicast router 110 at operation 2.9. After receiving the multicast membership report message 235, the multicast router 110 refreshes the multicast membership state for the group 180A for the multicast host 132A. For example, the access network congestion reduction module 145 resets a timer to send queries for the multicast host 132A. In one embodiment, prior to refreshing the multicast membership state for the multicast host 132A, the multicast router 110 determines that the bandwidth attributed to the subscriber 130A does not exceed the subscriber's bandwidth limit.

At operation 2.11, the multicast host 132B of the subscriber 130A transmits a multicast membership report message 240 that indicates that it is interested in joining the multicast group 180B. The multicast membership report message 240 may be an unsolicited report message (i.e., not transmitted in reply to a multicast membership query message). It should be understood that the multicast host 132A is still joined to the multicast group A. The multicast membership report message 240 is transmitted through the access network 125 and received at the multicast enabled layer 2 device 120.

The multicast enabled layer 2 device 120 updates the multicast state for the multicast group 180B to indicate that the multicast host 132B is interested in receiving the multicast data traffic for the multicast group 180B at operation 2.12. The multicast enabled layer 2 device 120 then floods the multicast membership report message 240 to the multicast source 115 and the multicast router 110 at operation 2.13. Sometime after the multicast source 115 receives the multicast membership report message 240, the multicast host 132B begins receiving the multicast data traffic corresponding to the multicast group 180B. Thus at operation 2.14, the multicast source 115 streams the multicast data traffic for the multicast group 180B to the multicast host 132B after receiving the multicast membership report message 210. The multicast data traffic is carried through the multicast enabled layer 2 device 120 and the access network 125. It should be understood that the multicast data traffic for the multicast group 180B will continue to be streamed to the multicast host 132B as long as the multicast host 132B is a member of the multicast group 180B.

Sometime after the multicast router 110 receives the multicast membership report message 240 flooded from the multicast enabled layer 2 device 120, the multicast router 110 processes the multicast membership report message 240 and determines whether to impede the multicast host 132B from refreshing its membership to the membership group 180B or whether to impede the multicast host 132A from refreshing its membership to the membership group based on whether the subscriber has exceeded their allowed bandwidth limit. For example, with reference to FIG. 3, the access network congestion reduction module 145 determines the bandwidth requirement of the multicast group 180B in operation 355, updates the bandwidth attributed to the subscriber 130A with the bandwidth requirement of the multicast group 180B in operation 360, and compares the bandwidth usage of the subscriber 130A with its allowed bandwidth limit. At operation 2.15, the multicast router 110 determines that the bandwidth limit for the subscriber 130A has been exceeded. Thus, joining the multicast group 180B has caused the amount of bandwidth attributed to the subscriber 130A to exceed its allowed amount. Since the bandwidth usage of the subscriber 130A exceeds its bandwidth limit, there is the possibility of congestion at the access network 125.

Referring back to FIG. 3, the access network congestion reduction module 145 receives the multicast membership report message 240 at operation 350. In one embodiment, the multicast membership report message 240 is received on the same subscriber circuit for the subscriber 130A that the multicast membership report message 210 was received on. The access network congestion reduction module 145 accesses the multicast group bandwidth mapping structure 310 at operation 355 to determine the amount of bandwidth necessary for the multicast group 180B. The necessary amount of bandwidth is then added to the record of the amount of bandwidth currently being used by the subscriber 130A in the bandwidth allocation and usage structure 320 at operation 360. The access network congestion reduction module 145 then compares the current bandwidth usage (including the amount of bandwidth necessary for the multicast group) of the subscriber 130A at operation 365.

For this example, joining the multicast group 180B has caused the subscriber 130A to exceed its allowed amount. As a result, in one embodiment, the access network congestion reduction module 145 does not add the multicast host 132B to the membership list of the multicast group 180B (e.g., an entry is not added for the multicast host 132B for the multicast group in the multicast group membership structure 330). However, the access network congestion reduction module 145 does modify the entry for the subscriber 130A in the bandwidth allocation and usage structure 320 to indicate that the subscriber 130A is in congestion reduction mode. In congestion reduction mode, instead of periodically transmitting one or more multicast membership general query messages to the multicast hosts of the subscriber 130A, the access network congestion reduction module 145 periodically transmits multicast membership group-specific query messages to identified one(s) of the multicast hosts of the subscriber 130 at operation 385 that request the multicast membership state of only a subset of the subscribed multicast groups to impede each of the multicast hosts of the subscriber 130A from refreshing its membership to all of the subscribed multicast groups. In one embodiment, the access network congestion reduction module 145 includes only those multicast group(s) that are indicated in the multicast group membership structure 330 for the subscriber 130A in the multicast membership group-specific query messages. To say it another away, the access network congestion reduction module 145 will not cause a multicast membership group-specific query to be transmitted to those multicast host(s) for those multicast group(s) that caused the subscriber 130A to exceed its bandwidth limit. In other embodiments, the subset of multicast group(s) included in the multicast membership group-specific query message(s) is chosen differently (e.g., the most recently joined multicast group(s), the lowest bandwidth multicast group(s), or the highest bandwidth multicast group(s)).

With reference back to FIG. 2, at operation 2.16, the multicast router 110 transmits a multicast membership group-specific query 250 to the multicast host 132A. The multicast membership group-specific query 250 requests the reception state of only the multicast group 180A. It should be understood that the multicast router 110 does not transmit a multicast membership general query message to the multicast hosts of the subscriber 130A (e.g., the multicast host 132A-B) (which would request the complete multicast reception state of those multicast hosts) and also does not transmit a multicast membership group-specific query message to the multicast host 132B for the multicast group 180B. In the absence of a multicast membership general query message or a multicast membership group-specific query message for the multicast group 180B, the multicast host 132B is impeded from refreshing its membership to the multicast group 180B. It should be understood that if the multicast host 132B does not refresh its membership to the multicast group 180B in a certain amount of time, the multicast membership state 135 on the multicast enabled layer 2 device 120 for the multicast host 132B for the multicast group 180B will be deleted and the data traffic for the multicast group 180B will not be transmitted accordingly.

Sometime after receiving the multicast membership group-specific query 250, at operation 2.17 the multicast host 132A transmits a multicast membership report message 255 that indicates that it is a member of the group 180A (a multicast refresh message). It should be understood that although at the time of this transmission the multicast host 132B is a member of the multicast group 180B, the multicast host 132B will not respond to the multicast membership group-specific query 250 since the query message 250 was transmitted to the multicast host 132A and it is specific to learn the reception state only relative to the multicast group 180A. The multicast membership report message 255 is transmitted through the access network 125 and received at the multicast enabled layer 2 device 120.

The multicast enabled layer 2 device 120 refreshes the multicast membership state of the multicast host 132A for the multicast group 180A (e.g., it resets a timer associated with the multicast membership state of the multicast host 132A for the multicast group 180A) at operation 2.18. Since the multicast enabled layer 2 device 120 will not receive a multicast membership report message to refresh the multicast membership state of the multicast host 132B for the multicast group 180B, that state will expire (e.g., the timer associated with the multicast membership state of the multicast host 132B for the multicast group 180B will expire) and the multicast host 132B will be removed from the list of subscriber(s) that are interested in receiving data traffic for the multicast group 180B. This will cause the multicast data traffic for the multicast group 180B from being received at the multicast host 132B (it should be understood, however, that the multicast enabled layer 2 device 120 and the access network 125 may continue to receive the multicast data traffic for the multicast group 180B assuming that there is at least another one of the subscribers 130A-N that has a multicast host that is a member of that group). By impeding the multicast host 132B of the subscriber 130A from refreshing the multicast group 180B, the congestion at the access network 125 caused by the multicast hosts of the subscriber 130A oversubscribing to multicast groups will be eliminated.

At operation 2.19, the multicast enabled layer 2 device 120 floods the multicast membership report message 210 towards the multicast source 115 and the multicast router 110. Since the multicast membership state of the multicast host 130A for the multicast group 180A was refreshed, the multicast data traffic for the multicast group 180A will continue to be streamed to it.

In one embodiment, the multicast router 100 periodically transmits multicast membership group-specific query messages to the identified multicast hosts (e.g., the multicast host 132A) of the subscriber 130A until a multicast membership report message is received that indicates that a multicast host of the subscriber 130A has left (a multicast leave message) one or more multicast groups that causes the amount of bandwidth being used by the subscriber 130A to be lower than its allowed bandwidth limit. When this happens, the multicast router 110 transitions back to periodically transmitting multicast membership general query messages to the multicast hosts of the subscriber 130A. In other embodiments, the multicast router 100 waits a period of time that it expects the multicast membership state will expire on the multicast enabled layer 2 device 120 before transitioning from transmitting multicast membership group-specific query messages to transmitting multicast membership general query messages.

Figure 4:
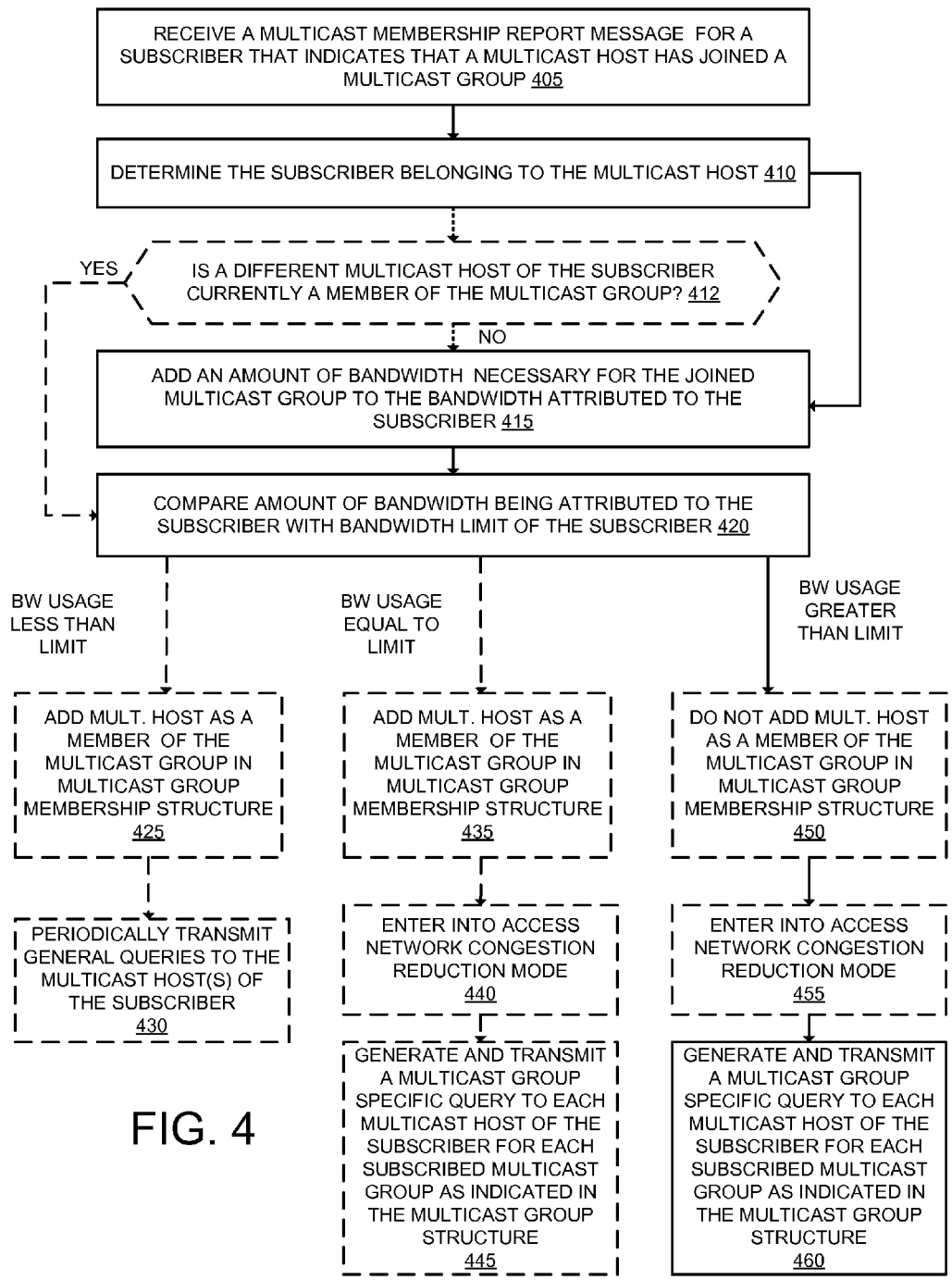
FIG. 4 is a flow diagram illustrating exemplary operations for a multicast router to reduce congestion in an access network caused by a subscriber oversubscribing to multicast groups according to one embodiment.

FIG. 4 is a flow diagram illustrating exemplary operations for a multicast router to reduce congestion in an access network caused by a subscriber oversubscribing to multicast groups according to one embodiment. The operations of FIG. 4 will be described with reference to the exemplary embodiment of FIG. 1. However, it should be understood that the operations of FIG. 4 can be performed by embodiments of the invention other than those discussed with reference to FIG. 1, and the embodiments discussed with reference to FIG. 1 can perform operations different than those discussed with reference to FIG. 4.

At block 405, the multicast router 110 receives a multicast membership report message that indicates that a multicast host has joined a multicast group. With reference to FIG. 1, the multicast source 115 will also independently receive the multicast membership report message and multicast data traffic will begin to stream towards that multicast host. Flow then moves to block 410 and the multicast router 110 determines the subscriber belonging to the multicast host 410. For example, the multicast membership report message may be received on a subscriber circuit for the subscriber. In embodiments where there is a single stream of traffic delivered to the subscriber's premise for a particular multicast group regardless of the number of multicast hosts of that subscriber that are members of that multicast group, flow moves from block 410 to block 412. In embodiments where there is a separate stream of traffic delivered to the subscriber's premise for each multicast host that is a member of the same multicast group, flow moves from block 410 to block 415.

At block 412, the multicast router 110 determines whether a different multicast host of the subscriber is currently a member of the multicast group indicated in the received multicast membership report message. For example, with reference to FIG. 3, the access network congestion reduction module 145 accesses the multicast group membership structure 330 for the identified subscriber to determine whether a different multicast host is currently a member of the multicast group indicated in the received multicast membership report message. If a different multicast host of the subscriber is currently a member of that multicast group, then flow moves to block 420, otherwise flow moves to block 415.

At block 415, the multicast router 110 adds the amount of bandwidth necessary for the joined multicast group to the current amount of bandwidth that is attributed to being used by the subscriber. For example, with reference to FIG. 3, the access network congestion reduction module 145 accesses the multicast group bandwidth mapping structure 310 to determine the bandwidth necessary for the joined multicast group and adds it to the bandwidth usage in the subscriber's entry in the bandwidth allocation and usage structure 320. Flow moves from block 415 to block 420.

At block 420, the multicast router 110 compares the amount of bandwidth currently attributed as being used by the subscriber against the subscriber's allowed bandwidth limit. In some embodiments the multicast router 110 determines whether to enter congestion reduction mode solely based on the amount of bandwidth used for multicast data traffic for a subscriber (e.g., whether the amount of bandwidth currently being used for multicast data traffic is equal to or exceeds a multicast allowed bandwidth limit). In other embodiment, non-multicast traffic is also taken into consideration (e.g., the multicast router 110 may also determine the amount of bandwidth being used by the subscriber for non-multicast traffic (e.g., general unicast data traffic, traffic for VoIP, etc.)). If the amount of bandwidth attributed to the subscriber as being used is less than its allowed bandwidth limit, then flow moves to block 425. If the amount of bandwidth attributed to the subscriber as being used is substantially equal to the allowed bandwidth limit, then flow moves to block 435. If the amount of bandwidth attributed to the subscriber as being used is greater than the allowed bandwidth limit, then flow moves to block 445.

At block 425 (the amount of bandwidth being used is less than the allowed bandwidth limit), the multicast router 110 adds the multicast host as a member of the multicast group in the multicast group membership structure 330. Flow then moves to block 430 and the multicast router 110 periodically transmits multicast membership general query messages to the multicast host (and other multicast hosts of the subscriber).

At block 435 (the amount of bandwidth being used is substantially equal to the allowed bandwidth limit), the multicast router 110 adds the multicast host as a member of the multicast group in the multicast group membership structure 330. However, instead of periodically transmitting multicast membership general query messages to the multicast host(s) of the subscriber, the multicast router 110 periodically transmits multicast membership group-specific queries to identified ones of the multicast host(s). Flow moves from block 435 to block 440 and the multicast router 110 enters into access network congestion reduction mode for the subscriber. Flow moves to block 445 and the multicast router 110 generates and periodically transmits a multicast membership group-specific query message to each multicast host of the subscriber for each subscribed multicast group as indicated in the multicast group structure to impede the multicast hosts of the subscriber from responding to the query message by joining an additional multicast group (which would cause the amount of used bandwidth to exceed the limit).

At block 450 (the amount of bandwidth being used is greater than the allowed bandwidth limit), the multicast router 110 does not add the multicast host as a member of the multicast group in the multicast group membership structure 330. Flow then moves to block 455 and the multicast router 110 enters into access network congestion reduction mode for the subscriber. Flow then moves to block 460 and the multicast router 110 generates and periodically transmits a multicast membership group-specific query message to each multicast host of the subscriber for each subscribed multicast group as indicated in the multicast group structure (which does not include the multicast group indicated in the multicast membership report message) to impede the multicast host that sent the multicast membership report message from refreshing the multicast membership state for the multicast group indicated in that multicast membership report message. As a result, the multicast data traffic for that multicast group will not be refreshed will stop being received at the multicast host.

In one embodiment, the multicast router 110 continues to transmit multicast membership group-specific queries to the multicast host(s) of a subscriber that has oversubscribed its session until it receives a multicast membership report message indicating that one or more multicast hosts of the subscriber has left one or more multicast groups causing the amount of bandwidth being attributed as being used by that subscriber to be lower than its allowed limit.

Figure 5:
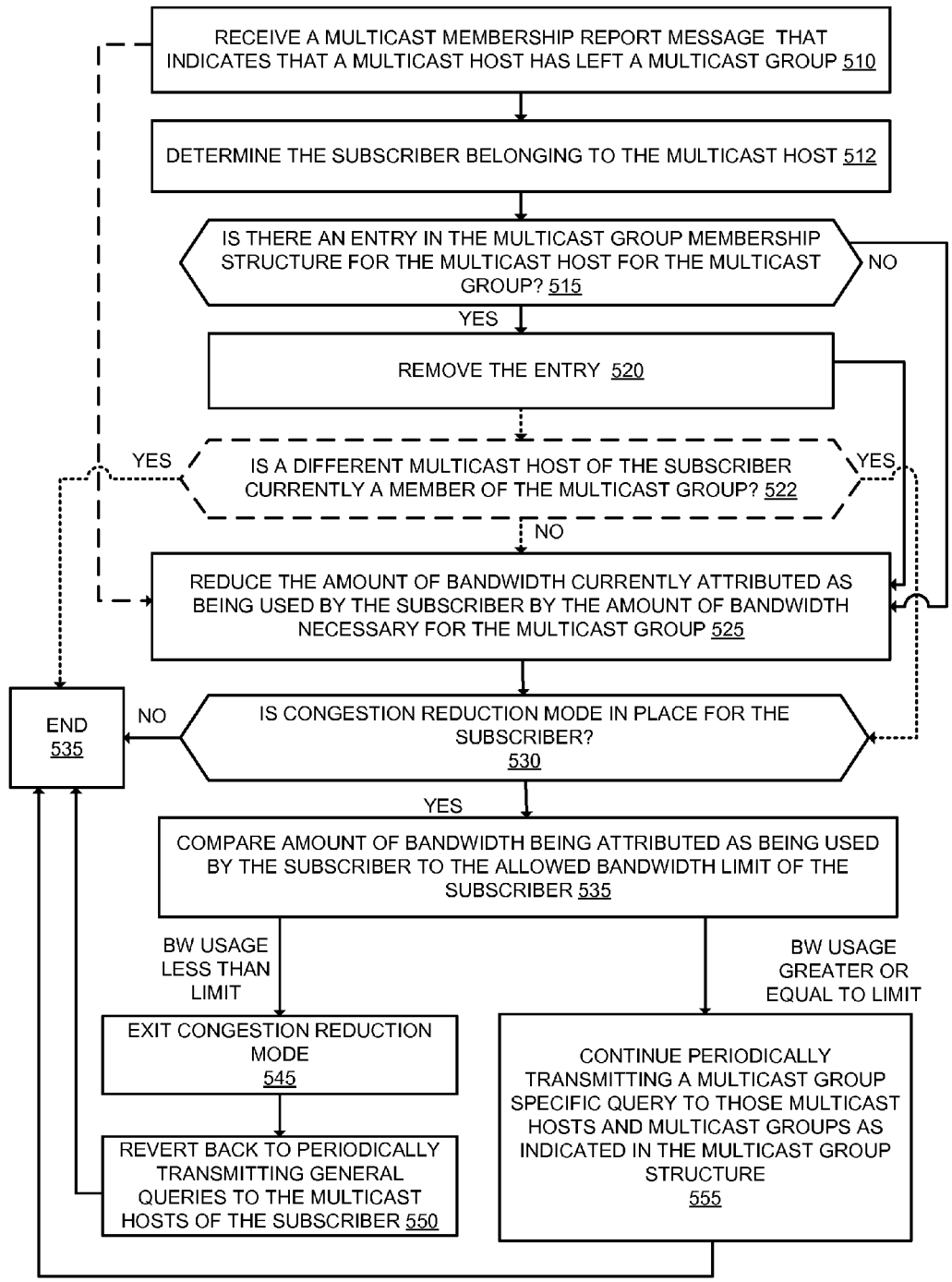
FIG. 5 is a flow diagram illustrating exemplary operations performed responsive to a multicast router receiving a multicast membership report message indicating that a subscriber has left a multicast group according to one embodiment.

FIG. 5 is a flow diagram illustrating exemplary operations performed responsive to a multicast router receiving a multicast membership report message indicating that a multicast host has left a multicast group according to one embodiment. The operations of FIG. 5 will be described with reference to the exemplary embodiment of FIG. 2. However, it should be understood that the operations of FIG. 5 can be performed by embodiments of the invention other than those discussed with reference to FIG. 1, and the embodiments discussed with reference to FIG. 1 can perform operations different than those discussed with reference to FIG. 5.

At block 510, the multicast router 110 receives a multicast membership report message that indicates that a multicast host has left a multicast group (a leave group message). In one embodiment, flow moves from block 510 to block 512, while in another embodiment flow moves from block 510 to block 525.

At block 512, the multicast router 110 identifies the subscriber belonging to the multicast host. For example, the multicast membership report message may be received on a subscriber circuit for the subscriber. Flow then moves to block 515. At block 515, the multicast router 110 determines whether there is an entry in the multicast group membership structure 330 for the subscriber the multicast group indicated in the multicast membership report message. If there is not, then flow moves to block 525; otherwise flow moves to block 520 and the multicast router 110 removes that entry from the multicast group membership structure 330.

In embodiments where there is a single stream of traffic delivered to the subscriber's premise for a particular multicast group regardless of the number of multicast hosts of that subscriber that are members of that multicast group, flow moves from block 520 to block 522. In embodiments where there is a separate stream of traffic delivered to the subscriber's premise for each 520 to block 525. At block 522, the multicast router 110 determines whether there is a different multicast host of the subscriber that is currently a member of the multicast group indicated in the received multicast membership report message. For example, with reference to FIG. 3, the access network congestion reduction module 145 accesses the multicast group membership structure 330 for the identified subscriber to determine whether a different multicast host is currently a member of the multicast group indicated in the received multicast membership report message. In this embodiment, if a different multicast host of the subscriber is currently a member of the multicast group and since a single stream of multicast data traffic for the multicast group is being delivered to the subscriber's premise, the multicast host leaving the multicast group indicated in the multicast membership report message will not affect the amount of bandwidth attributed as being used by the subscriber. Thus, if there is a different multicast host of the subscriber that is currently a member of the multicast group, in one embodiment flow moves from block 522 to block 535 and the process ends, and in another embodiment flow moves from block 522 to block 530. If there is not another multicast host of the subscriber that is currently a member of the multicast group, then flow moves to block 525.

At block 525, the multicast router 110 calculates the amount of bandwidth currently being used by the subscriber taking into account the amount of bandwidth used by the multicast group that the subscriber has left as indicated in the multicast membership report message. Thus, the amount of bandwidth currently being used by the subscriber is reduced by the amount of bandwidth required by the multicast group that the subscriber has left as indicated in the multicast membership report message. Flow moves from block 525 to block 530.

At block 530, the multicast router 110 determines whether access network reduction mode is currently in place for the subscriber. If it is, then flow moves to block 535; otherwise flow moves to block 535 and the operations end. At block 535, the multicast router 110 compares the amount of bandwidth being attributed as being used by the subscriber to the allowed bandwidth limit of the subscriber. If it is less than the allowed bandwidth limit for the subscriber, then flow moves to block 545; otherwise flow moves to block 555.

At block 555 (the amount of bandwidth being attributed as being used by the subscriber is greater than or equal to the allowed limit), the multicast router 100 continues to periodically transmit a multicast membership group-specific query message to those of the multicast hosts indicated in the multicast group structure 330 for the subscribed multicast groups. Flow then moves from block 555 to block 535.

At block 545 (the amount of bandwidth being used by the subscriber is less than the allowed limit), the access network congestion reduction mode is exited. For example, the multicast router 110 indicates in the bandwidth allocation and usage structure 320 for the subscriber that it is not in access network congestion reduction mode. Flow then moves to block 550 and the multicast router 110 reverts back to periodically transmitting multicast membership general query messages to the multicast hosts of the subscriber. Thus, after the amount of bandwidth attributed as being used by the subscriber drops below its allowed limit, the multicast router 110 transitions from transmitting multicast membership group-specific queries to multicast membership general queries. Flow then moves to block 535.

Although FIG. 5 was described with reference to operations performed responsive to receiving a multicast membership report message that indicates that a multicast host has left a single multicast group, it should be understood that a multicast membership report message can be received that indicates that a multicast host has left multiple multicast groups. In such a case, in one embodiment, the operations described with reference to blocks 515-555 are performed for each multicast group that is indicated as being left in the multicast membership report message.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Figure 6:
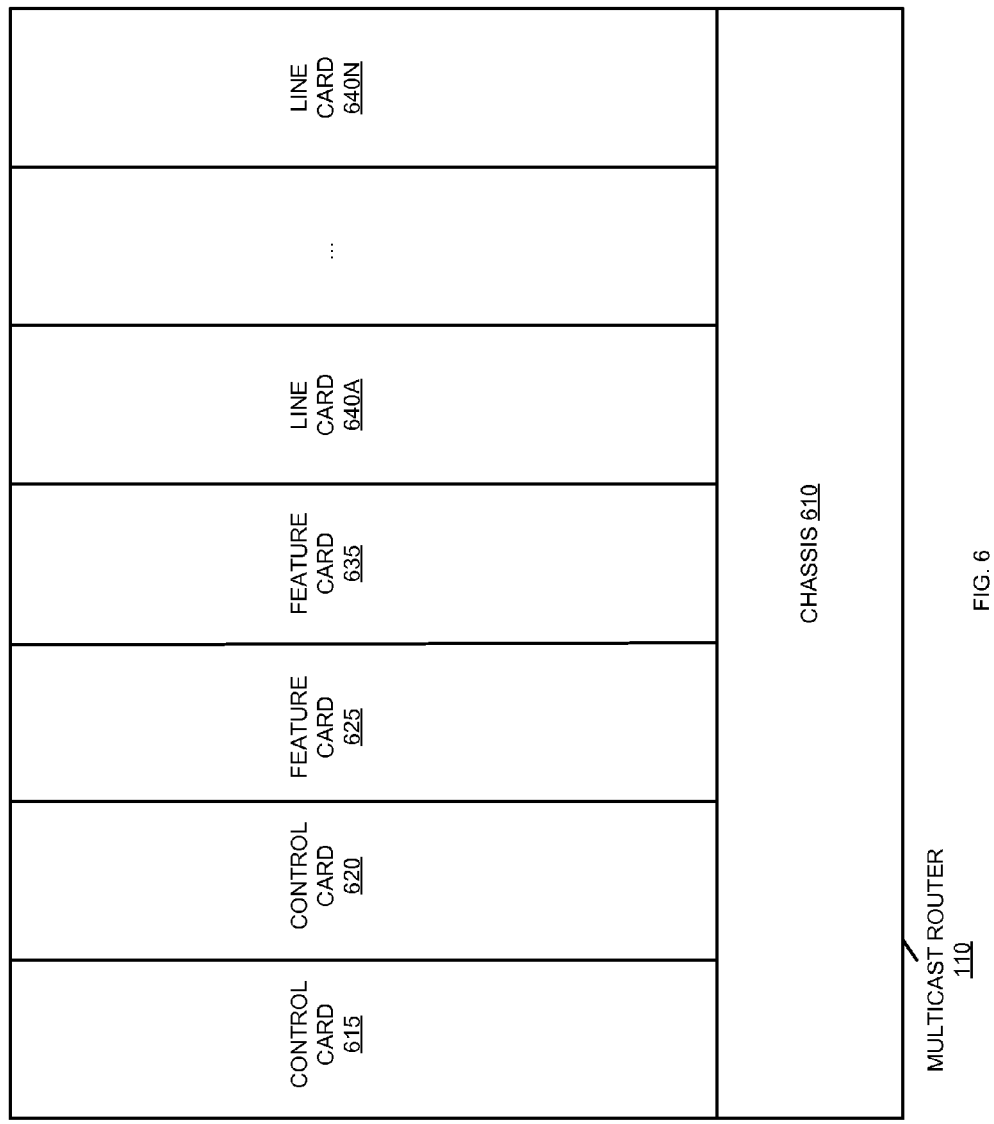
FIG. 6 is a block diagram illustrating an exemplary architecture of the multicast router illustrated in FIG. 1 according to one embodiment.

FIG. 6 is a block diagram illustrating an exemplary architecture of the multicast router 110 according to one embodiment. The multicast router 110 is a type of network element. As illustrated in FIG. 6, the multicast router 110 includes the control cards 615 and 620 (e.g., a primary and secondary control card), the feature cards 625 and 635, and the line cards 640A-N, each of which are coupled to the chassis 610. These cards are also coupled together through one or more mechanisms (e.g., a first full mesh coupling the line cards and a second full mesh coupling all of the cards). The set of line cards 640A-N make up the data plane (sometimes referred to as a forwarding plane or a media plane) and include processing units (e.g., one or more packet processing ASICs) used to forward packets. The set of feature cards 625 and 635 provide specialized processing (e.g., e.g., Layer 4 to Layer 7 services (e.g., firewall, IPsec, IDS, P2P), VoIP Session Border Controller, Mobile Wireless Gateways (GGSN, Evolved Packet System (EPS) Gateway)). The control cards 615 and 620 provide the control plane and exchange control packets with other network elements through the line cards. In one embodiment, the multicast module 140 and the access network congestion reduction module 145 are implemented on one or more of the control cards 615 and 620. It should be understood that the architecture illustrated in FIG. 6 is exemplary, and different embodiments may use different architectures. For example, in some embodiments, the multicast router includes one or more control cards and one or more line cards and does not include a feature card.

While FIG. 3 illustrated exemplary formats for the multicast group bandwidth mapping structure 310, the bandwidth allocation and usage structure 320, and the multicast group membership structure 330, it should be understood that the formats are exemplary (e.g., alternative embodiments may store the information into more structures or less structures).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method at a multicast router for reducing congestion in an access network caused by oversubscription of multicast groups, wherein the multicast router is coupled with a multicast enabled layer 2 device that is coupled with a source of multicast data traffic for the multicast groups and maintains multicast membership state of the multicast groups, the method comprising the steps of:
   receiving a first multicast membership report message that indicates that a multicast host of a subscriber has joined a first multicast group, wherein the multicast host is one of a set of one or more multicast hosts of the subscriber, and wherein one or more of the set of multicast hosts are a member of a set of one or more second multicast groups;
   calculating an amount of bandwidth currently being attributed as being used by the subscriber based on at least an amount of bandwidth that is required for the first multicast group and the set of second multicast groups; and
   responsive to determining that the amount of bandwidth currently being attributed as being used by the subscriber exceeds its allowed bandwidth limit due to the multicast host joining the first multicast group, switching from periodically transmitting multicast membership general query messages to the set of multicast hosts to transmitting one or more multicast membership group-specific query messages to those of the set of multicast hosts that are a member of the set of second multicast groups, wherein the one or more multicast membership group-specific query messages do not request membership reception state of the first multicast group, and wherein the one or more multicast membership group-specific query messages is not sent to the multicast host of the subscriber joining the first multicast group.

2. The method of claim 1, wherein the multicast data traffic is not forwarded through the multicast router.

3. The method of claim 1, wherein the allowed bandwidth limit for the subscriber is specific to multicast data traffic.

4. The method of claim 1, wherein the step of calculating the amount of bandwidth currently used by the subscriber is further based on an amount of bandwidth corresponding to non-multicast data traffic currently being attributed as being used by the subscriber.

5. The method of claim 1, further comprising the steps of:
   receiving a second multicast membership report message that indicates that one of the set of multicast hosts of the subscriber has joined a third multicast group;
   calculating an amount of bandwidth currently attributed as being used by the subscriber based on at least the amount of bandwidth that is required for the third multicast group and the set of second multicast groups; and
   responsive to determining that the amount of bandwidth currently being attributed as being used by the subscriber is substantially equal to its allowed bandwidth limit, switching from periodically transmitting multicast membership general query messages to those of the set of multicast hosts that are a member of the set of second multicast groups to transmitting one or more multicast membership group-specific query messages to those of the set of multicast hosts that are a member of the set of second multicast groups that do not request membership reception state of the third multicast group to impede the set of multicast hosts from joining an additional multicast group while the set of multicast hosts is a member of each of the set of second multicast groups and the third multicast group.

6. The method of claim 1, further comprising the step of:
   periodically transmitting the multicast membership group-specific query messages to the set of multicast hosts for the set of second multicast groups while the set of multicast hosts maintain membership to the set of second multicast groups and until a second multicast membership report message is received from the multicast host that joined the first multicast group that indicates that it has left the first multicast group.

7. The method of claim 6, further comprising the steps of:

receiving the second multicast membership report message that indicates that the multicast host that joined the first multicast group has left the first multicast group; and responsive to determining that an amount of bandwidth currently being attributed as being used by the subscriber is lower than the allowed bandwidth limit for the subscriber, transitioning from periodically transmitting the multicast membership group-specific query messages to periodically transmitting multicast membership general query messages to the set of multicast hosts of the subscriber.

8. A multicast router to reduce congestion in an access network caused by oversubscription of multicast groups, the multicast router comprising:

a control card having a multicast module configured to perform the following:

receive multicast membership report messages originated from a set of one or more multicast hosts of a plurality of subscribers, wherein each multicast membership report message indicates multicast group membership status of one of the set of multicast hosts of one of the subscribers for one or more multicast groups, wherein multicast data traffic for the one or more multicast groups is not forwarded through the multicast router, track bandwidth usage attributed to the plurality of subscribers based at least in part on the received multicast membership report messages, and for each subscriber whose bandwidth usage exceeds their allowed bandwidth limit due to oversubscription to a plurality of multicast groups, switching from periodically transmitting multicast membership general query messages to the set of multicast hosts of that subscriber to periodically transmitting one or more multicast membership group-specific query messages to one or more of the set of multicast hosts for a subset of one or more of the plurality of multicast groups, wherein the one or more multicast membership group-specific query message do not require membership reception state of multicast groups not included in the subset of the plurality of multicast groups, and wherein the one or more multicast membership group-specific query messages is not sent to the multicast host of the subscriber joining the first multicast group.

9. The multicast router of claim 8, wherein the multicast router is to be coupled to a multicast enabled layer 2 device that maintains multicast membership state of the multicast groups for the set of multicast hosts of the subscribers that must be periodically refreshed by the set of multicast hosts of the subscribers in order for multicast data traffic to continue to be transmitted to the set of multicast hosts of the subscribers, wherein the multicast enabled layer 2 device is to be coupled with a source of multicast data traffic for the multicast groups.

10. The multicast router of claim 8, wherein the multicast module is further configured to, for each subscriber whose bandwidth usage exceeds their allowed bandwidth limit, periodically cause the set of multicast membership group-specific query messages to be transmitted to the one or more of the set of multicast hosts of that subscriber until one or more multicast membership report messages are received that indicate that one or more of the set of multicast hosts of that subscriber has left one or multicast groups thereby reducing the bandwidth that is attributed as being used by the subscriber to a value that is smaller than its allowed bandwidth limit.

11. The multicast router of claim 8, wherein the multicast module is further configured to, for each subscriber whose bandwidth usage is substantially equal to their allowed bandwidth limit, switching from periodically transmitting multicast membership general query messages to the set of multicast hosts of that subscriber to periodically transmitting one or more multicast membership group-specific query messages to one or more of the set of multicast hosts for a subset of one or more of the plurality of multicast groups to impede the set of multicast hosts of that subscriber from joining an additional multicast group prior to one or more of the set of multicast hosts of the subscriber leaving one or more of its currently subscribed multicast groups that reduces the bandwidth that is attributed as being used by the subscriber to a value that is smaller than its allowed bandwidth limit.

12. The multicast router of claim 8, wherein the allowed bandwidth limit for each subscriber is specific to multicast data traffic.

13. The multicast router of claim 12, wherein the control card further includes a memory that stores one or more data structures that indicates, for each multicast group, an amount of bandwidth required for that multicast group, and wherein for each of the plurality of subscribers, the multicast module is configured to track multicast bandwidth usage of that subscriber based on the amount of bandwidth required for each multicast group that that subscriber is currently a member of.

14. A system to reduce congestion in an access network, comprising:

a multicast source of multicast data traffic for a plurality of multicast groups;

a multicast enabled layer 2 device that is coupled with the multicast source, a multicast router, and an access network element, wherein the multicast enabled layer 2 device is configured to:

maintain multicast membership state to the plurality of multicast groups for a plurality of multicast hosts of a plurality of subscribers that are coupled with the access network element, and forward multicast membership report messages originated from the multicast hosts to the multicast source and the multicast router; and the multicast router including a multicast module configured to perform the following:

receive the multicast membership report messages, wherein each multicast membership report message indicates a multicast group membership status of one of the multicast hosts of the subscribers for one or more of the multicast groups, track bandwidth usage attributed to the plurality of subscribers based at least in part on the received multicast membership report messages, and for each subscriber whose bandwidth usage exceeds their allowed bandwidth limit due to oversubscription of multicast groups, switching from periodically transmitting multicast membership general query messages to the multicast hosts of that subscriber to periodically transmitting one or more multicast membership group-specific query messages to one or more of the multicast hosts of the subscriber for a subset of the subscribed multicast groups, wherein the one or more multicast membership group-specific query message do require membership reception state of multicast groups not included in the subset of the plurality of multicast groups, and wherein the one or more multicast membership group-specific query messages is not sent to the multicast host of the subscriber joining the first multicast group.

15. The system of claim 14, wherein the multicast data traffic for the plurality of multicast groups is not forwarded through the multicast router.

16. The system of claim 14, wherein the allowed bandwidth limit for each subscriber is specific to multicast data traffic.

17. The system of claim 14, wherein the multicast module of the multicast router is further configured to, for each subscriber whose bandwidth usage exceeds their allowed bandwidth limit, periodically cause the set of multicast membership group-specific query messages to be transmitted to the multicast hosts of that subscriber until one or more multicast membership report messages are received that indicate one or more of the multicast hosts of that subscriber has left one or multicast groups thereby reducing the bandwidth that is attributed as being used by the subscriber to a value that is smaller than its allowed bandwidth limit.

18. The system of claim 14, wherein the multicast module of the multicast router is further configured to, for each subscriber whose bandwidth usage is substantially equal to their allowed bandwidth limit, switching from periodically transmitting multicast membership general query messages to the multicast hosts of that subscriber to periodically transmitting one or more multicast membership group-specific query messages to one or more of the multicast hosts for a subset of the subscribed multicast groups to impede the multicast hosts of that subscriber from joining an additional multicast group prior to one or more of the multicast hosts of the subscriber leaving one or more of the subscribed multicast groups that reduces the bandwidth that is attributed as being used by the subscriber to a value that is smaller than its allowed bandwidth limit.

19. The system of claim 14, wherein the multicast router further includes a memory to store one or more data structures that indicate, for each multicast group, an amount of bandwidth required for that multicast group, and wherein for each of the plurality of subscribers, the multicast module is configured to track multicast bandwidth usage of that subscriber based on the amount of bandwidth required for each multicast group that that subscriber is currently a member of.

\* \* \* \* \*